Feb. 24, 1942.                J. W. HARRELL                2,273,957
                            TURBULENCE MANIFOLD
                            Filed Jan. 28, 1941
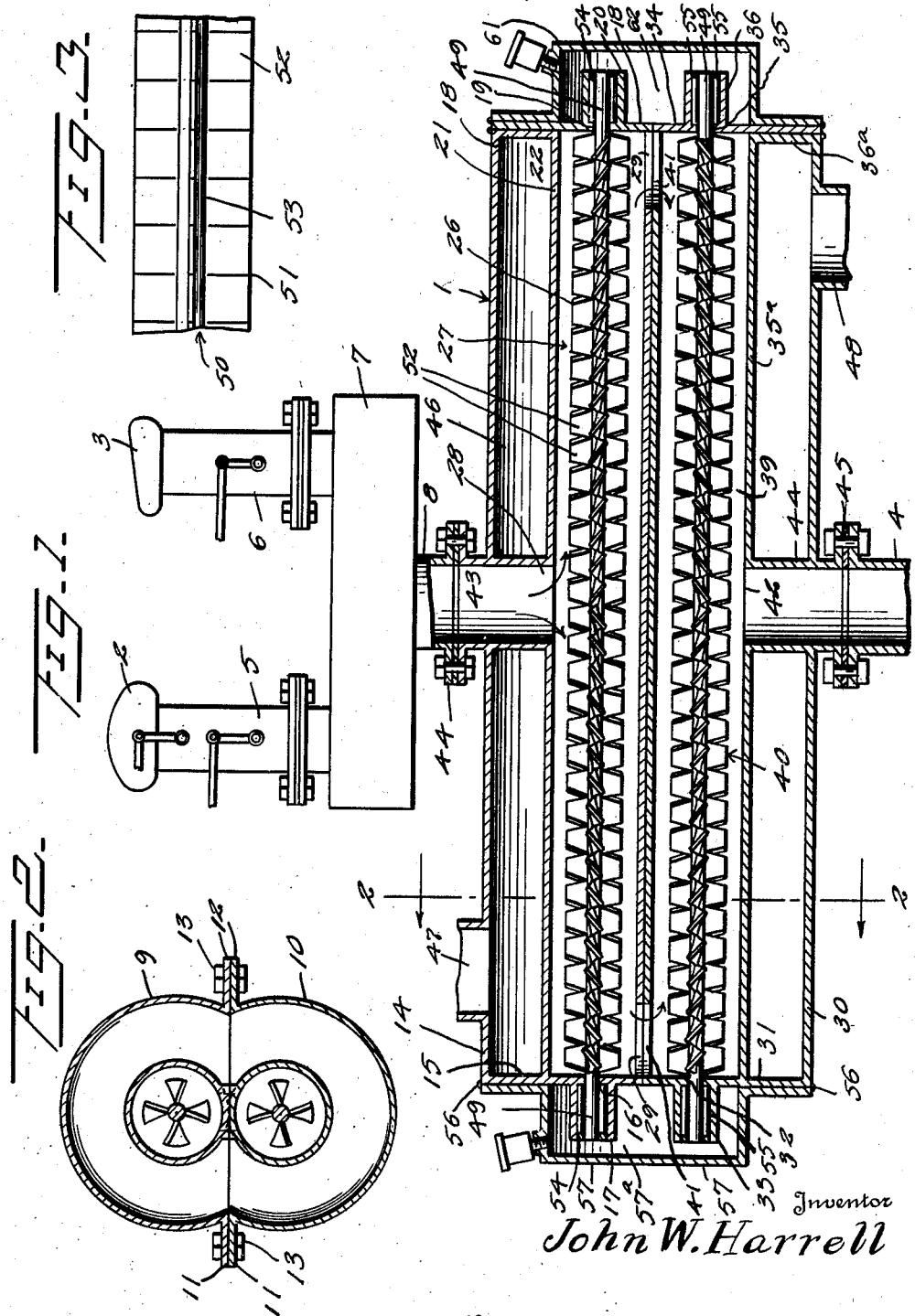
Inventor
John W. Harrell
By Kimmel & Crowell
Attorneys Patented Feb. 24, 1942

2,273,957

UNITED STATES PATENT OFFICE 2,273,957

TURBULENCE MANIFOLD

John W. Harrell, Cincinnati, Ohio

Application January 28, 1941, Serial No. 376,377

8 Claims. (Cl. 48—180)

This invention relates to a turbulence manifold for interposition between one or more carburetors and the intake manifold of an internal combustion engine.

The invention aims to provide, in a manner as hereinafter set forth, a manifold of the class referred to for not only throughly mixing fuel and air, but also for expanding the same after it passes from a carburetor or carburetors and before it enters the intake manifold of the engine, and whereby when supplied to the combustion chamber of the engine it results in the engine operating with more power, at less expense, and at the same time overcomes the knock or ping of the motor on the hardest pull or on a hill and under such conditions reducing gear shifting.

The invention further aims to provide, in a manner as hereinafter set forth, a turbulence manifold including a pair of superposed bodily revolving groups of vanes, fins or turbulence plates for thoroughly mixing air and fuel on the travel thereof towards the combustion chamber of an internal combustion engine and with the aforesaid groups bodily revolving from the suction of the engine.

The invention further aims to provide, in a manner as hereinafter set forth, a turbulence manifold for the purpose referred to which is simple in its construction and arrangement, readily installed relative to a carburetor and an intake manifold, thoroughly efficient in its use, comparatively inexpensive to set up, strong, durable and compact.

Embodying the aims aforesaid and others which may hereinafter appear, the invention consists of the novel construction and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a longitudinal sectional view of a turbulence manifold in accordance with this invention showing the adaptation thereof with respect to a pair of carburetors and the intake manifold of an internal combustion engine, Figure 2 is a section on line 2—2 Figure 1, and Figure 3 is a fragmentary view in front elevation illustrating the form of blank from which the fins, vanes and turbulence plates are formed.

With reference to the drawing, the turbulence manifold, in accordance with this invention, is generally indicated at 1 and it is shown by way of example in connection with a pair of carburetors 2, 3 and the intake manifold 4 of an internal combustion engine. The carburetors 2, 3 as shown are provided with valve controlled fuel conducting pipes 5, 6 respectively, which are common to and open into a receiver 7 having an outlet 8. By way of example the carburetor 2 may be for gasoline and the carburetor 3 for oil. It is to be understood that the manifold 1 may be used solely in connection with a single carburetor and if so, its fuel conducting pipe will be connected directly to the intake to be referred to of the manifold 1.

The manifold 1 consists of a pair of superimposed oppositely disposed sections 9, 10 of rounded form each provided with a pair of oppositely disposed flanges 11, 12 extending lengthwise thereof. The flanges 11, 12 of the section 9 are seated upon the flanges 11, 12 of the section 10. The flanges of one section are detachably secured to the flanges of the other section by the holdfast means 13.

The section 9 includes a body part 14 of shell-like form open at its bottom and having formed integral therewith a side wall 15 formed with an opening 16 and an outward directed annular sleeve 17. The section 9 also includes a side wall 18 formed with an opening 19 and an outwardly directed integral annular sleeve 20. Integral with the inner face of the side wall 15 and extending to a point in close proximity to the side wall 18 is a tubular member 21 connected to the body part 14 by a coupling piece 22. The side wall 18 is secured with the body portion 14 by welding or otherwise. The tubular member 21 provides a chamber 26 for a rotatable turbulence element 27 to be hereinafter referred to. The tubular member 21 is formed with a fuel intake 28 and a pair of fuel outlets 29 for the chamber 26.

The section 10 includes a body part or portion 30 of shell-like form which is open at its top and has formed integral therewith a side wall 31 provided with an opening 32 and an outwardly directed annular sleeve 33. The section 10 also includes a side wall 34 formed with an opening 35 and an outwardly directed integral annular sleeve 36. Integral with the inner face of the side wall 31 and extending to a point in close proximity to the side wall 34 is a tubular member 35ª, which is connected to the body part 30 by a coupling piece 36ª. The side wall 31 is secured to the body portion 30 by welding or otherwise. The tubular member 35ª provides a chamber 39 for a rotatable turbulence element 40 to be hereinafter referred to. The tubular member 35ª is formed with a pair of fuel intakes 31 and a fuel outlet 42.

Integral with the body portion 14 and with the top of the tubular member 21, as well as opening into the latter is a fuel conductor 43 which communicates with and is connected to the outlet 8, as at 44. Formed integral with the body portion 30 and with the bottom of the tubular member 35ª, as well as opening into the latter is a fuel outlet pipe 44, which is connected to the intake manifold 4, as at 45.

The bottom of the tubular member 21 abuts the top of the tubular member 35ª and the outlets 29 of the tubular member 21 register with the intakes 41 of the tubular member 35ª. The chamber 26 constitutes an upper mixing chamber and the chamber 39 a lower mixing chamber.

The sections 9, 10 are arranged in superimposed abutting relation, and the end walls 15, 31 and the couplers 22, 36ª coact with said body portions or parts to form a heating chamber 46, which surrounds the mixing chambers 26 and 39. The chamber 46 includes an intake 47, which is adapted to communicate with the exhaust manifold of the engine. The chamber 46 has an outlet 48. The utilizing of the chamber 46 is for the purpose of having the heat contained therein expand the fuel in the mixing chambers 26 and 39 during the travel of the fuel therethrough.

The elements 27, 40 are of like form and each consists of a shaft 49 and four rows of torsionally twisted fins, vanes or turbulence plates, which will be hereinafter referred to as vanes. Each row is formed from a strip 50 of metallic material of the desired thickness transversely slitted, as at 51, and the material freed by the slits is torsionally twisted to form the vanes 52. The slits terminate adjacent the inner end of the strip to form an anchoring part 53, which is secured to the shaft 49. The strips are of less length than the length of the shaft and are so disposed relative to the latter whereby the shaft will project from each end of the strip. The projecting ends of the shaft of the turbulence element 27 extend into the sleeves 17, 20 and are surrounded by roller bearings 54. The shaft 49 of the turbulence element 40 extends into the sleeves 33, 36 and are surrounded by roller bearings 55. The elements 27 and 40 are bodily revolved from the suction action of the engine. Arranged against the outer face of the walls 15 and 31 and enclosing the sleeves 17, 23 is a housing 57 providing an oil well 57ª for the purpose of lubricating one end of the shafts 49 of the elements 27, 40. The housing 57 is suitably secured to the sections 9, 10.

Positioned against and suitably secured to the side walls 19 and 34 is a housing 61 which encloses the sleeves 20 and 36 and provides an oil well 62 for the shafts of the elements 27, 40.

The fuel supplied from a carburetor or a pair of carburetors enters the chamber 26 and is mixed by the element 27, as the latter is bodily revolved from the suction of the engine. The fuel after being acted upon in the chamber 26 by the element 27 passes into the chamber 39 where it is acted upon by the bodily revolving element 40, which is operated from the suction of the engine and it passes from chamber 39 into the intake manifold 4 and from there into the combustion chamber of the engine. The action is such that the fuel and the air are thoroughly mixed and are also expanded due to the heat contained in the chamber 46. The fuel and air are so thoroughly mixed before they enter the combustion chamber of the engine whereby when they are supplied to such chamber the result is that the engine will operate with more power, at less expense, and at the same time the use of the fuel will overcome the knock or ping on the hardest pull or on a hill, and under such conditions reducing gear shifting.

What I claim is:

1. In a fuel and air turbulence manifold for use in connection with internal combustion engines a pair of superimposed horizontally disposed mixing chambers, means for establishing communication between one chamber and a source of fuel and air, means for establishing communication between the other chamber and the intake manifold of the engine, the said one chamber having spaced outlets in its bottom, the said other chamber having spaced intakes in its top registering with said outlets, for establishing communication between said chambers, and a suction operated bodily revoluble group of turbulence vanes disposed throughout each of said chambers.

2. In a fuel and air turbulence manifold for use in connection with internal combustion engines a pair of superimposed horizontally disposed mixing chambers, means for establishing communication between one chamber and a source of fuel and air, means for establishing communication between the other chamber and the intake manifold of the engine, the said one chamber having spaced outlets in its bottom, the said other chamber having spaced intakes in its top registering with said outlets, for establishing communication between said chambers, a suction operated bodily revoluble group of turbulence vanes disposed throughout each of said chambers, and a heating chamber surrounding the mixing chambers and adapted to communicate with the exhaust manifold of the engine.

3. In a fuel and air turbulence manifold for use in connection with internal combustion engines a pair of superimposed horizontally disposed mixing chambers, means for establishing communication between one chamber and a source of fuel and air, means for establishing communication between the other chamber and the intake manifold of the engine, the said one chamber having spaced outlets in its bottom, the said other chamber having spaced intakes in its top registering with said outlets, for establishing communication between said chambers, a pair of suction operated shafts each having the major portion of its length arranged in a mixing chamber and the remaining portion of its length extending from the ends of the chamber, spaced rows of torsionally twisted turbulence vanes disposed lengthwise of the said major portion of each shaft, bearings for said shafts exteriorly of the ends of said chambers, and lubricating means for said bearings.

4. In a fuel and air turbulence manifold for use in connection with internal combustion engines a pair of superimposed horizontally disposed mixing chambers, means for establishing communication between one chamber and a source of fuel and air, means for establishing communication between the other chamber and the intake manifold of the engine, the said one chamber having spaced outlets in its bottom, the said other chamber having spaced intakes in its top registering with said outlets, for establishing communication between said chambers, a pair of suction operated shafts each having the major portion of its length arranged in a mixing chamber and the remaining portion of its length extending from the ends of the chamber, spaced rows of torsionally twisted turbulence vanes disposed lengthwise of the said major portion of each shaft, bearings for said shafts exteriorly of the ends of said chambers, lubricating means for said bearings, and a heating chamber surrounding the mixing chambers, disposed inwardly of said bearings and adapted to communicate with the exhaust manifold of the engine.

5. In a fuel and air turbulence manifold for communication with a carburetor and intake manifold of an internal combustion engine, a structure including a pair of parallel simultaneously heated permanently communicating superimposed horizontally disposed tubular mixing chambers one communicating with said carburetor and the other with said intake manifold and each of said chambers being formed with end walls provided with aligned axial openings, a suction operated turbulence element disposed throughout each of said chambers and including oppositely disposed shaft portions extended through the openings in said end walls of a chamber, each of said elements including radially disposed spaced rows of vanes arranged throughout a chamber, and enclosed bearings for said shaft portions.

6. In a fuel and air turbulence manifold for communication with a carburetor and intake manifold of an internal combustion engine, a structure including a pair of parallel simultaneously heated permanently communicating superimposed horizontally disposed tubular mixing chambers one communicating with said carburetor and the other with said intake manifold and each of said chambers being formed with end walls provided with aligned axial openings, a suction operated turbulence element disposed throughout each of said chambers and including oppositely disposed shaft portions extended through the openings in said end walls of a chamber, each of said elements including radially disposed spaced rows of vanes arranged throughout a chamber, enclosed bearings for said shaft portions, and said structure including a heating chamber common to and enclosing said mixing chambers inwardly of said bearings.

7. In a fuel and air turbulence manifold for use in connection with internal combustion engines, a mixing chamber having end walls formed with aligned axial apertures, means for establishing communication between said chamber and a source of fuel and air, means for establishing communication between said chamber and the intake manifold of the engine, a suction operated shaft having an intermediate and a pair of end portions, said intermediate portion arranged in said chamber, said end portion extending through the apertures in and projecting outwardly from the said end walls, radially disposed spaced rows of torsionally twisted turbulence vanes disposed lengthwise of said intermediate portion and arranged within said chamber from end to end thereof, and bearings for said end portions.

8. In a fuel and air turbulence manifold for use in connection with internal combustion engines, a mixing chamber having end walls formed with aligned axial apertures, means for establishing communication between said chamber and a source of fuel and air, means for establishing communication between said chamber and the intake manifold of the engine, a suction operated shaft having an intermediate and a pair of end portions, said intermediate portion arranged in said chamber, said end portion extending through the apertures in and projecting outwardly from the said end walls, radially disposed spaced rows of torsionally twisted turbulence vanes disposed lengthwise of said intermediate portion and arranged within said chamber from end to end thereof, bearings for said end portions arranged exteriorly of said end walls, and a heating chamber surrounding said mixing chamber disposed inwardly of said bearings and adapted to communicate with the exhaust manifold of the engine.

JOHN W. HARRELL.